W. P. MURPHY.
RELEASE RIGGING FOR CAR COUPLINGS.
APPLICATION FILED NOV. 10, 1915.
1,290,970.
Patented Jan. 14, 1919.
2 SHEETS—SHEET 1.
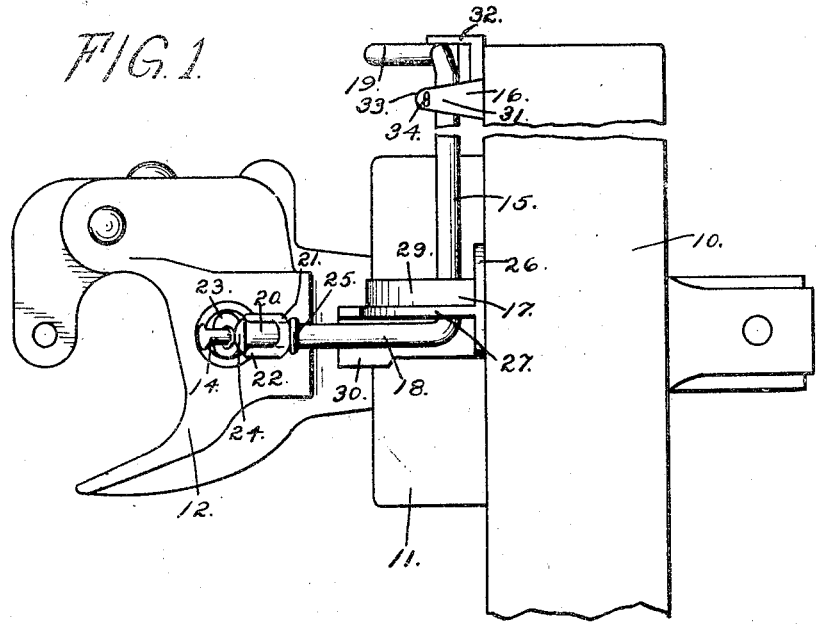
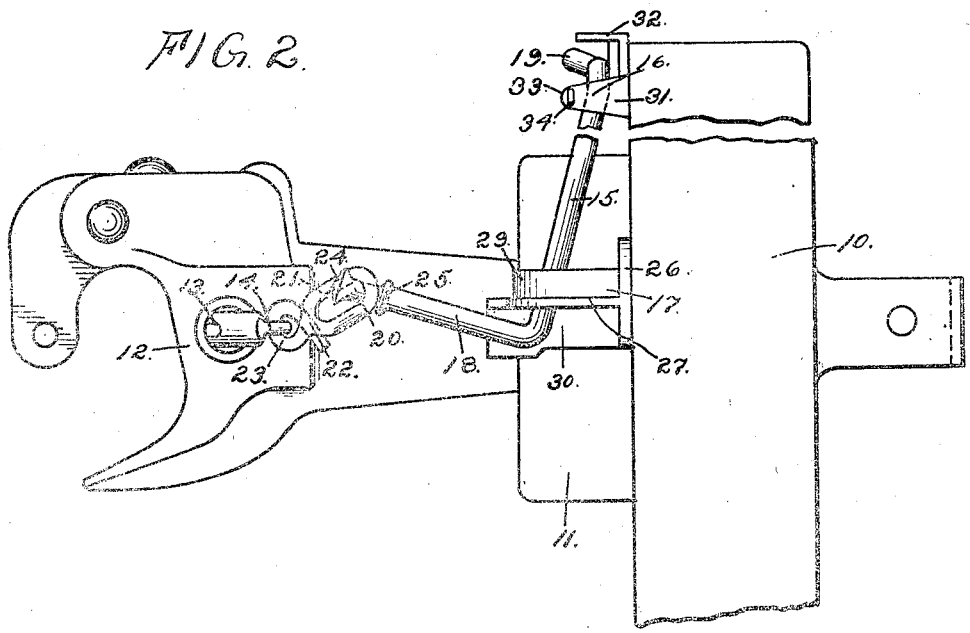

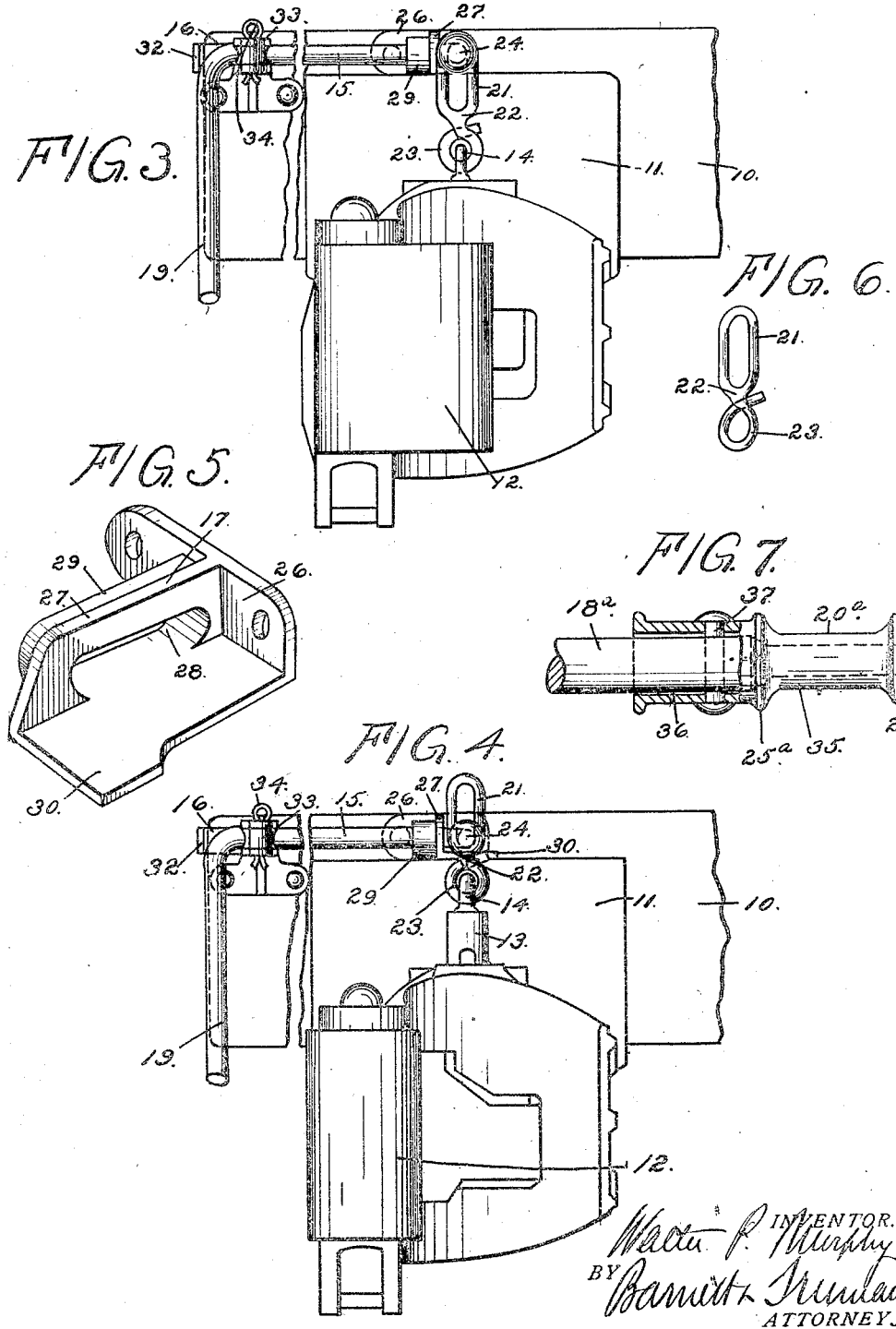

UNITED STATES PATENT OFFICE.

WALTER P. MURPHY, OF CHICAGO, ILLINOIS.

RELEASE-RIGGING FOR CAR-COUPLINGS.

1,290,970.

Specification of Letters Patent.

Patented Jan. 14, 1919.

Application filed November 10, 1915. Serial No. 60,754.

*To all whom it may concern:*

Be it known that I, WALTER P. MURPHY, a citizen of the United States, residing at Chicago, in the county of Cook and State of Illinois, have invented certain new and useful Improvements in Release-Rigging for Car-Couplings, of which the following is a specification.

My invention relates to a release rigging or apparatus for pulling the locking pin of a car coupling. One of the principal objects of the invention is to provide a release rigging which will be simple and inexpensive to manufacture, which can be made of strong and durable parts, and which will be positive and efficient in its operation.

It has been common in the past to employ on freight cars a release rigging consisting of a rod revolubly mounted on the car with one end bent to form a handle and the other to form a crank, together with a chain which connects the locking pin of the coupler with the crank. Devices of this sort have proved very objectionable for reasons which are well understood by railroad men and have been generally condemned. One of the objects of my invention is to utilize this old equipment with as little change as possible, but to modify it by the substitution for the chain of a rigid link. The apparatus thus modified is wholly free from the objections to the old type of rigging, as will be apparent from the following description. It is not to be understood, however, that the invention is limited in its application to the remodeling of old equipment. The principles of my invention might be utilized in connection with newly manufactured apparatus.

The invention also contemplates, preferably, though not necessarily, constructing one or both of the brackets which support the operating rod or lever so that the lever may be removed therefrom, and, further, the construction of the connecting link in such manner that when the lever is in position in the brackets the connecting link cannot be disengaged from the eye of the locking pin; disconnection, however, being possible when the rod is removed from one or both of the brackets. Furthermore, the connection between the link and the lever is such that the link cannot be readily detached from the lever. This arrangement, by compelling the repair man to remove the lever from the brackets, one or both of them, when the coupler is to be repaired, insures a proper replacement of the parts which might be neglected if the connection to be disengaged were made by means of a clevis and bolt, or other like device, the replacement of which after the coupler had been repaired might easily be overlooked.

The invention consists of the combinations of parts hereinafter set forth in the claims for carrying out the above stated objects and such other objects as will appear in the following specification.

The invention is illustrated, in a preferred embodiment, in the accompanying drawings, wherein—

Figure 1 is a fragmentary plan view of the end sill of a railway car (the associated parts of the car structure being omitted for the sake of clearness) with the release rigging of my invention secured thereto.

Fig. 2 is a view similar to Fig. 1 showing the position which the parts must assume in the case of an emergency release which will follow from a failure of some part of the coupler or its attachments.

Fig. 3 is a fragmentary view, in elevation, of the apparatus.

Fig. 4 is a similar view to illustrate the capacity of the coupler to move vertically without interference from or disturbance of the release rigging.

Fig. 5 is a view, in perspective, of a preferred form of center bracket.

Fig. 6 is a view, in perspective, of the connecting link between the operating rod and the locking pin of the coupler, and Fig. 7 is a fragmentary elevation partly in section of a modified construction of the operating lever when the invention is utilized in changing over old equipment.

Like characters of reference designate like parts in the several figures of the drawings.

In the drawings, 10 is the end sill of the car, 11 the dead wood and 12 the coupler, the locking pin of which is shown at 13 and is formed with the usual eye 14. It will be realized that I do not wish to limit the invention to the particular type of coupler shown.

15 is the operating rod or lever of the release rigging which is revolubly mounted in an end bracket 16 and a center bracket 17. The inner end of the rod is bent to provide a crank 18. The outer end has a angular bend forming a handle 19. The crank 18 is formed at its extremity with a seat 20 for the loop 21 of the connecting link 22. The lower end of the connecting link extends through the eye 14 of the coupler pin. Preferably this portion of the link is in the form, generally speaking, of a spiral hook 23. That is, the extremity of the part extending through the eye of the pin is off-set out of the plane of the rest of the link. The purpose of this is to prevent any accidental disengagement of the link from the coupler pin due to draft, buffing, and other movements of the coupler. The seat 20 for the upper end of the connecting link terminates in an enlargement or shoulder 24 which prevents the link from being disconnected from the crank. Preferably the rod is formed with another shoulder 25 to prevent the link from slipping up along the crank when the rod is turned to raise the coupler pin.

The center bracket 17 consists preferably of a web 26 which lies against and is secured to the end sill 10 of the car, a vertical web 27 formed with an elongated slot 28, a boss 29 on one side of web 27 to increase the width of the surfaces against which the operating rod bears, and a horizontal web or shelf 30 which, by projecting for a considerable distance beyond the slot 28 affords a support for the crank of the operating rod and thereby keeps the latter in proper relation with the coupler.

The end bracket 16 consists of a fork 31 through which the operating rod passes, an angular projection 32 arranged to check the outward longitudinal movement of the operating rod, and a rounded closure piece 33 for closing the fork, the part 33 being held in place by a cotter pin 34 or other suitable device. The locking pin 14 is pulled by lifting on the handle 19 of the operating rod. When the locking pin has reached lock set position the flexibility of the connection between the crank of the operating rod and the connecting link permits the operating rod to turn back to its normal position.

If the coupler is to be repaired it may be disconnected from the release rigging by removing the cotter pin 34 and closure piece 33 and turning the operating rod in the bracket 17 to such position that the hook 26 of the link can be freed from the eye 14 of the locking pin. The repair man in replacing the coupler cannot very well overlook the fact that the operating rod is moved from the end bracket. It is reasonably certain, therefore, that the coupler will be properly connected up with the release rigging before the car is sent out of the shop. If the connection between the link and the locking pin were made by a closed eyelet, for example, which had to be opened when the coupler was taken off the car for repair it would be an easy matter for the workman to forget to bend the eyelet back to its closed position. My invention, it will be seen, provides, in its preferred embodiment, a hook on the lower end of the link which is always opened, but the hook is so formed and the other parts of the apparatus so constructed and arranged that with the rod in position in its brackets accidental disengagement is impossible while such disengagement can be readily made by removing the rod from the end bracket.

Instead of forming the stop shoulders 24, 25 and the seat for the connecting link between the shoulders as an integral part of the crank 18, a separate member 35 may be employed as shown in Fig. 7. The crank 18ª of the operating rod is drilled and the member 35 which is formed with a socket 36 may be secured to the rod by a rivet 37 or other suitable device. 24ª, 25ª represent the stop shoulders on member 35 between which is a seat 20ª for the loop of the connecting pin. By this expedient of making the connecting member for the link separate from the operating rod it is possible to adapt my invention to the remodeling of release riggings of the chain type above referred to. The link 22 is substituted for the chain. All that it is necessary to do is to cut off the eye on the end of the crank to which it was customary to attach the chain and drill the end of the rod.

While I have described my invention in certain preferred embodiments, it will be understood that further modifications might be made without departure from the principles of the invention. Therefore I do not intend to limit the invention to the precise constructions, arrangements and devices shown and described except so far as the claims appended hereto are so limited.

I claim:

1. A release rigging comprising an operating rod having a crank, means for revolubly supporting the same on the end of a car, a link adapted for engagement with a coupler lock and provided at its upper end with a loop, and a rounded member which extends through said loop and is formed with stop shoulders on opposite sides thereof and with a socket extending over and secured to the end of said crank.

2. A release rigging comprising an operating rod having a crank, means for revolubly supporting the same on a car, and a link adapted for engagement with a coupler lock and formed with a loop at the other end, the end of said crank being provided with a rounded seat slidably engaged by said loop and with stops on opposite ends of said seat to limit said sliding movement.

3. A release rigging comprising an operating rod having a crank, means for revolubly supporting the same on a car, and a link adapted for engagement with a coupler lock and formed with a loop at the other end, the end of said crank being provided with a rounded seat slidably engaged by said loop and with a stop at the outer end thereof.

4. A release rigging comprising an operating rod having a crank, means for revolubly supporting the same on a car, and a link formed at one end with an open, spirally formed hook and at the other with a loop, the end of said crank being provided with a rounded seat engaged within said loop for preventing the axial rotation of said link and with stops on opposite ends of said seat.

WALTER P. MURPHY.